A. C. STAHL.
TRANSMISSION MECHANISM.
APPLICATION FILED MAR. 19, 1917.

1,233,414.

Patented July 17, 1917.
3 SHEETS—SHEET 1.

Witness
Chas. W. Stauffiger
Karl H. Butler

Inventor
Ambrose C. Stahl,
By
Attorneys

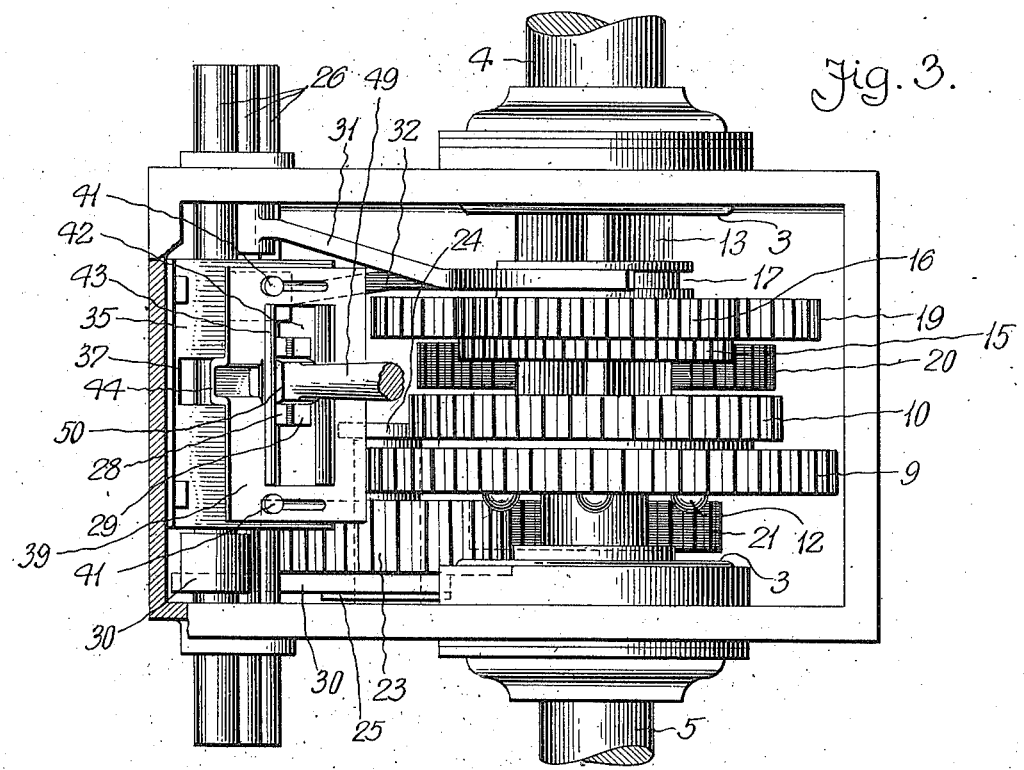

UNITED STATES PATENT OFFICE.

AMBROSE C. STAHL, OF HIGHLAND PARK, MICHIGAN.

TRANSMISSION MECHANISM.

1,233,414.  Specification of Letters Patent.  Patented July 17, 1917.

Application filed March 19, 1917. Serial No. 155,809.

*To all whom it may concern:*

Be it known that I, AMBROSE C. STAHL, a citizen of the United States of America, residing at Highland Park, in the county of Wayne and State of Michigan, have invented certain new and useful Improvements in Transmission Mechanism, of which the following is a specification, reference being had therein to the accompanying drawings.

This invention relates to a transmission mechanism for motor vehicles, and the primary object of my invention is to provide a change speed transmission mechanism wherein the change speed gears or members are compactly assembled so as to provide a comparatively short transmission casing which is a desideratum in connection with motor vehicle construction.

Another object of my invention is to provide change speed transmission mechanism wherein the majority of gears are shiftable relative to a compound driven shaft gear, such arrangement being in contradistinction to the usual change speed gear mechanism which has the majority of the gears in fixed relation.

A further object of my invention is to provide a mechanism of the above type wherein a novel locking device is employed for preventing accidental displacement of shiftable gears, thereby eliminating racking and precluding any possibility of gears being stripped or otherwise injured.

A still further object of my invention is to provide a transmission mechanism wherein the parts are constructed with a view of reducing the cost of manufacture and at the same time retain those features by which safety, durability and ease of assembling are secured. With such ends in view, my invention resides in the novel construction to be hereinafter described and then claimed.

Reference will now be had to the drawings, wherein—

Fig. 3 is a plan of the mechanism;

Fig. 4 is a perspective view of shiftable members forming part of the mechanism;

Fig. 5 is a perspective view of a detached bracket, and

Fig. 6 is a similar view of the detached locking member.

Figure 1:
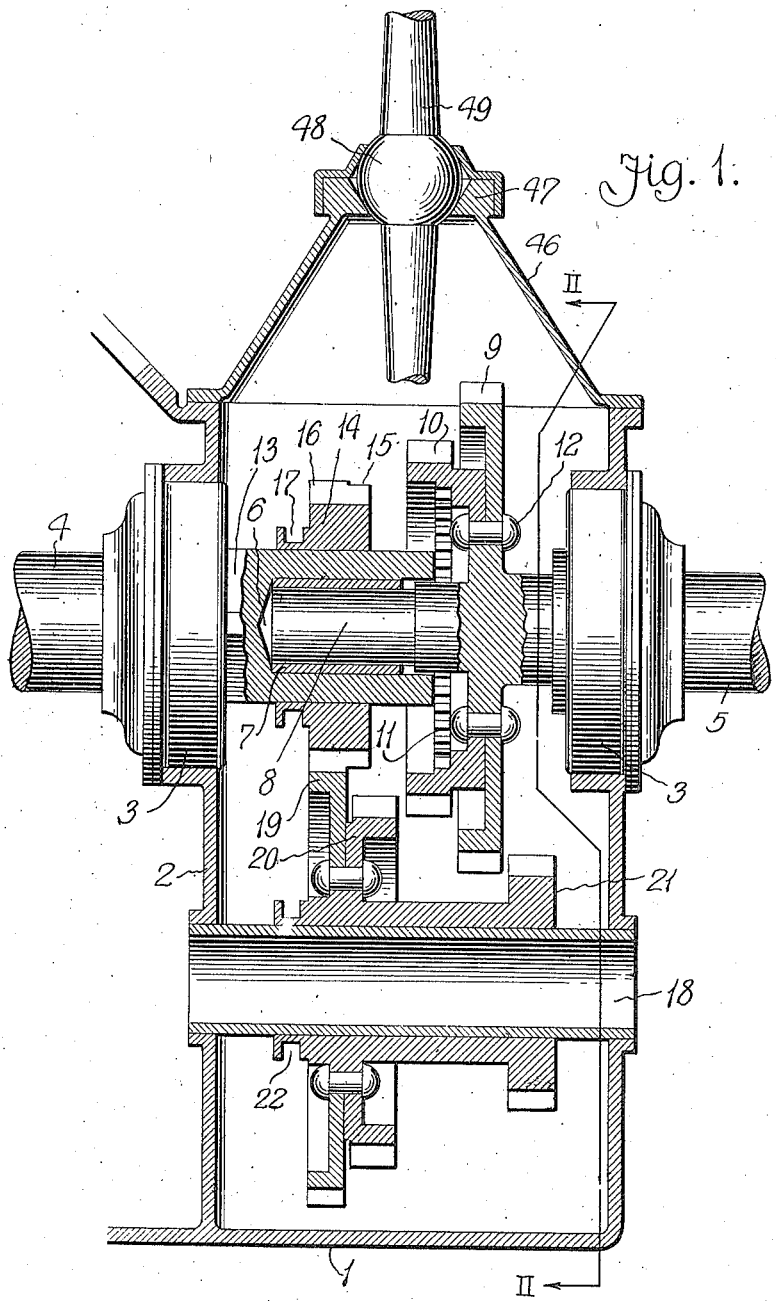
Figure 1 is a vertical longitudinal sectional view of a change speed gear transmission mechanism in accordance with my invention.

In the drawings, 1 denotes a transmission casing having opposed walls 2 thereof provided with bearings 3 for longitudinally alining drive and driven shafts 4 and 5 respectively. The drive shaft 4 may be driven by an engine or motor and the driven shaft 5 may impart movement to a differential mechanism or the rear axle of a vehicle.

The inner end of the drive shaft 4 is provided with a socket 6 and a bushing 7 to receive the reduced end 8 of the driven shaft 5. On said shaft, contiguous to the inner end of the drive shaft 4 is a triple gear composed of a large gear 9, an intermediate gear 10, and an internal gear 11. As a matter of good construction, the gears 10 and 11 are integral and the external large gear 9 is fixed to the gears 10 and 11 by rivets 12 or other fastening means. The large external gear 9 is used in obtaining a reverse speed and a third speed; the intermediate gear 10 in obtaining a second speed, and the internal gear 11 in obtaining a first speed or direct drive. The inner end of the drive shaft 4 has facets 13 and slidable on these facets and adapted for rotative continuity with the shaft 4 is a stepped gear 14 having teeth 15 and 16. This stepped gear is provided with a grooved hub 17 so that it may be shifted longitudinally of the drive shaft 4.

Connecting the walls 2 of the casing 1 is a tubular fixed shaft 18 and loose on this shaft to slide and rotate is a triple gear composed of gears 19, 20 and 21 and the gears 19 and 20 are closely assembled while the gear 21 is in spaced relation to the gear 20. The gears 20 and 21 can be conveniently made integral with a grooved hub 22 and the gear 19 suitably connected to the gear 20 so as to be in proximity thereto. The gear 19 is adapted to mesh with the teeth 16 of the gear 14; the gear 20 to mesh with the gear 10, and the gear 21 to mesh with the large gear 9.

Besides these gears, there is a reverse gear 23 on a counter or stub shaft 24 carried by an end wall of the casing, and this reverse gear has a grooved hub 25 so that it may be shifted longitudinally of the counter shaft 24 for engagement with the gear 21 and the large gear 9.

Slidable in the end walls of the casing 1 are shift rods 26 and on these rods are shift members 27, 28 and 29. The rod 26 carrying the shift member 27 has a forked arm 30 engaging the grooved hub 25 of the reverse gear 23; the rod 26 supporting the shift member 28 has a forked arm 31 engaging the grooved hub 17 to the gear 14, and the rod 26 supporting the shift member 29 has a forked arm 32 engaging the grooved hub 22 of the gears 20 and 21.

The shift members 27, 28 and 29 are bifurcated as at 33, and said members extend upwardly into a longitudinal slot 34 in an angularly disposed bracket 35 suitably connected to the wall of a transmission casing 1. The bracket 35 has depending guide flanges 36 and said brackets, as well as the flanges, are notched as at 37 and 38. On the bracket 35 is a shiftable locking member 39 having the ends thereof slotted, as at 40 so that the locking member 39 may be retained upon the bracket 35 by studs or pins 41. The locking member 39 has a longitudinal slot 42 and the longitudinal marginal edges of said slot have upturned flanges 43. Intermediate the ends of the locking member 39 are depressed portions 44 and 45, the purpose of which will hereinafter appear.

The transmission casing 1 has a cap 46 provided with a ball socket 47 for the ball portion 48 of an operating lever 49. The operating lever 49 is of the conventional form adapted to be oscillated or shifted relative to an H plate or indicia member (not shown). The lower end of the operating lever 49 is angularly disposed and terminates in a head 50 that extends through the slot 42 of the locking member 39, the slot 34 of the bracket 35 and is adapted to extend into the bifurcations 33 of the members 27, 28 and 29.

The transmission mechanism has been illustrated in neutral position in Fig. 1, with no driving relation between the shafts 4 and 5. When first speed or direct drive is required, the gear 14 is shifted until the teeth 15 thereof engage the internal gear 11, thus establishing a driving connection between the shafts 4 and 5. To shift the gear 14, the arm 31 and the member 28 are moved by the operating lever 49 and the slot 34 in the bracket 35 is of sufficient width to permit of the head 50 simply engaging in the bifurcation of the shift member 28, without engaging the members 27 and 29. When the head 50 simply engages the member 28, the depressed portions 44 and 45 of the locking member engage in the bifurcations 33 of the shift members 27 and 29, and as the locking member is held against longitudinal movement upon the bracket 35, it is impossible for the members 27 and 29 to accidentally shift the gears 19, 20 and 21 and 23.

Figure 2:
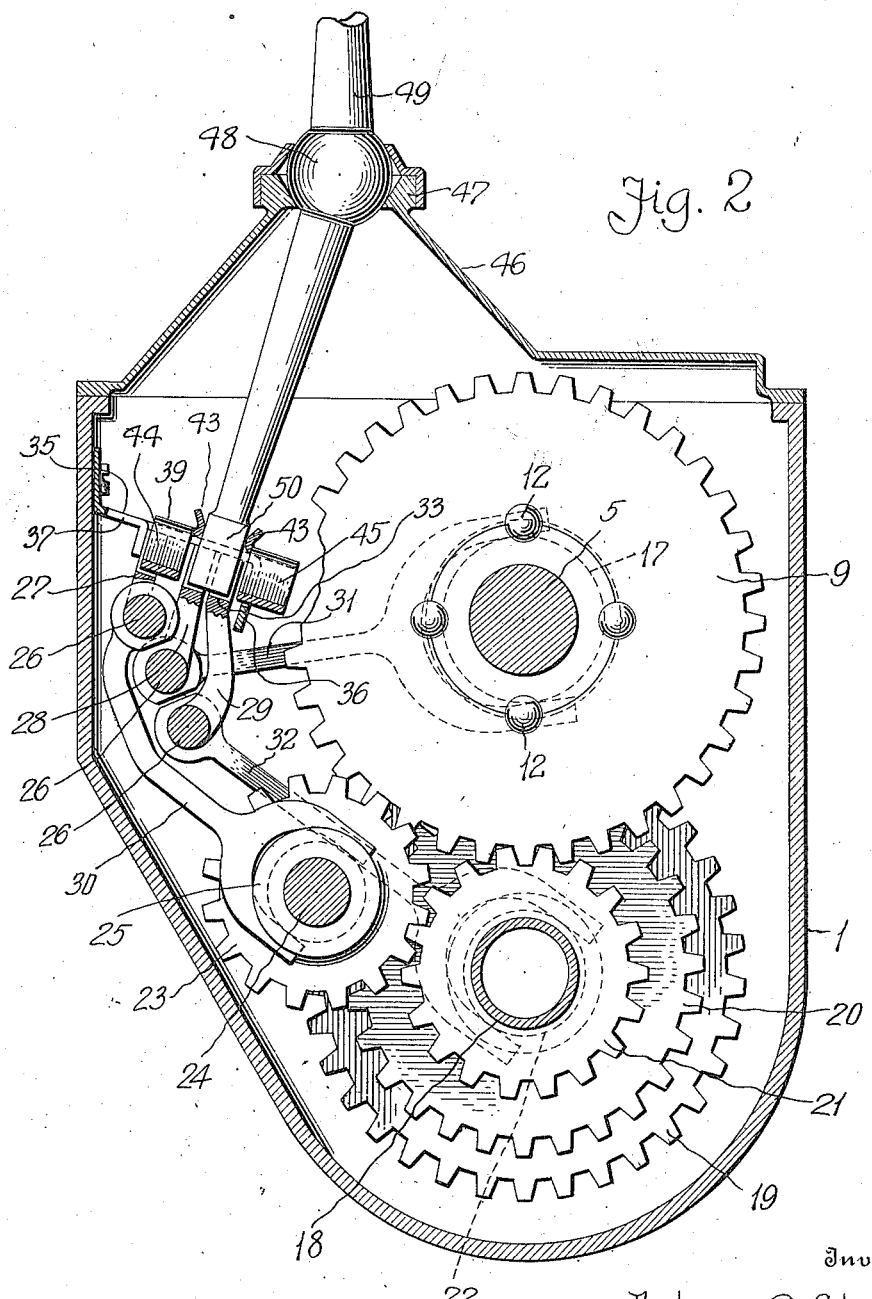
Fig. 2 is a vertical sectional view of the same taken on the line II—II of Fig. 1.

When second speed is desired, the gears 14 and 19 are shifted in synchronism until the gear 20 engages the gear 10. The gear 21 will be in engagement with the reverse gear 23, without any result, and the teeth 15 of the gear 14 will be free of the internal gear 11. To shift the gears 14, 19 and 20 in synchronism, the arms 31 and 32 are moved through the medium of the members 28 and 29, these members being engaged by the head 50 of the operating lever 49, with the locking member engaging the shift member 27 to prevent accidental displacement of said member, as shown in Fig. 2 of the drawings.

When third speed is desired, the gears 14, 19, 20 and 21 are shifted in synchronism until the gear 21 engages the large gear 9. This is accomplished by moving the gears in an opposite direction from that required for second speed.

When reverse speed is desired, the reverse gear 23 is shifted to establish a driving connection between the gears 9 and 21 and the shifting of the reverse gear 23 is accomplished by the arm 30, the member 27, and the head 50 of the operating lever engaging solely in the member 27. The bracket 35 provides sufficient clearance for the locking member 39 so that the depression 45 of said locking member can engage in the bifurcations of the members 28 and 29 and hold said members against accidental movement.

An inspection of Fig. 1 of the drawing shows that the transmission casing has been materially shortened compared to the usual transmission mechanism and this is brought about by using the compound and triple gears compactly assembled to obtain desired speeds, and also that the counter shaft 18 and gears 19, 20 and 21 remain idle or stationary on first speed or direct drive.

While in the drawings there is illustrated a preferred embodiment of my invention it is to be understood that the structural elements are susceptible to such changes as in size, shape and manner of assemblage as fall within the scope of the appended claims.

What I claim is:—

1. In a change speed gear transmission mechanism, a drive shaft, a driven shaft, a triple gear fixed on said driven shaft, a compound gear shiftable on said drive shaft adapted to mesh with a portion of said triple gear, a triple gear shiftable relative to the compound gear and the triple gear of said driven shaft and adapted to mesh with either, a shiftable reverse gear adapted to mesh with both triple gears, and means adapted for simultaneously and independently moving all of said shiftable gears.

2. In a change speed gear transmission mechanism, a drive shaft, a driven shaft, a triple gear fixed on said driven shaft, a compound gear shiftable on said drive shaft adapted to mesh with a portion of said triple gear, a triple gear shiftable relative to said compound gear and the triple gear of said driven shaft and adapted to mesh with either, a shiftable reverse gear adapted to mesh with both triple gears, individual shifting means for said shiftable gears, and means actuated by said shifting means for locking those gears not actuated by said shifting means against accidental displacement.

3. In a change speed gear transmission mechanism, a drive shaft, a driven shaft, a triple gear fixed on said driven shaft, a compound gear shiftable on said drive shaft adapted to mesh with a portion of said triple gear, a triple gear shiftable relative to said compound gear and the triple gear of said driven shaft, and adapted to mesh with either, a shiftable reverse gear adapted to mesh with both triple gears, shift members for said shiftable gears, an operating lever engageable with said shift members adapted for moving either shift member and two of said shift members, and a locking member actuated by said operating lever adapted to hold those shift members not affected by said operating lever against accidental movement.

4 In a change speed gear transmission mechanism, a casing, a drive shaft, a driven shaft alining with said drive shaft and telescoped thereby within said casing, a triple gear fixed on said driven shaft, a compound gear shiftable on said drive shaft adapted to mesh with a portion of said triple gear, a triple gear shiftable relative to said compound gear, and the triple gear of said driven shaft and adapted to mesh with either, a shiftable reverse gear in said casing adapted to mesh with both triple gears, individual shifting means within said casing for said shiftable gears, an operating lever extending into said casing common to said shifting means and adapted for establishing driving relations between the gears within said casing, and means actuated by said operating lever for locking those gears not actuated by said shifting means against accidental movement.

In testimony whereof I affix my signature in the presence of two witnesses.

AMBROSE C. STAHL.

Witnesses:
KARL H. BUTLER,
ANNA M. DORR.